United States Patent [19]

Fun

[11] Patent Number: 4,483,409

[45] Date of Patent: Nov. 20, 1984

[54] INTEGRAL HYDRAULIC TILT-CAB SUSPENSION AND TILTING APPARATUS

[75] Inventor: Johannes K. Fun, Delden, Netherlands

[73] Assignee: Applied Power Inc., Milwaukee, Wis.

[21] Appl. No.: 472,493

[22] Filed: Mar. 7, 1983

[51] Int. Cl.³ .............................................. B62D 27/00
[52] U.S. Cl. .................... 180/89.15; 280/104; 280/689; 280/703; 296/190
[58] Field of Search .............. 180/89.13, 89.14, 89.15, 180/89.16; 296/190; 280/104, 689, 703

[56] References Cited

U.S. PATENT DOCUMENTS

| | | | |
|---|---|---|---|
| 3,761,123 | 9/1973 | Neill et al. | 180/89.15 |
| 3,797,883 | 3/1974 | Steiner et al. | 180/89.14 |
| 3,945,664 | 3/1976 | Hiruma | 280/703 |
| 3,948,341 | 4/1976 | Foster | 180/89.15 |
| 4,095,822 | 6/1978 | Thornhill | 280/104 |
| 4,372,411 | 2/1983 | Flower | 180/89.15 |
| 4,440,252 | 4/1984 | Steinecke et al. | 180/89.15 |

Primary Examiner—David M. Mitchell
Assistant Examiner—Kenneth R. Rice
Attorney, Agent, or Firm—John J. Byrne; Edward E. Dyson; Bradford E. Kile

[57] ABSTRACT

A tilt-cab tractor including a chassis, a cab pivotally mounted about an axis near the front of the chassis, a suspension cylinder mounted at each corner of the cab, at least one hydraulic cab tilting cylinder, an accumulator, and a first conduit connecting the accumulator to the suspension cylinders wherein the improvement comprises; a source of pressurized hydraulic fluid for delivering hydraulic fluid to the hydraulic tilting cylinder and the shock absorber suspension cylinders, a second and third hydraulic conduit for delivering hydraulic fluid to the cab tilting cylinder and for delivering hydraulic fluid to the first conduit respectively, a control valve and means for selectively blocking flow of pressurized hydraulic fluid to the accumulator when the tractor brakes are applied.

11 Claims, 3 Drawing Figures

INTEGRAL HYDRAULIC TILT-CAB SUSPENSION AND TILTING APPARATUS

TECHNICAL FIELD

This invention relates to an integral hydraulic suspension and raising and lowering cylinder system for a tiltable, over-the-engine, tractor cab.

In the trucking industry the tractor portion of a tractor trailer combination is often designed with a cab mounted on top of the tractor engine and transmission. Such a design, among other things, minimizes the overall length of the rig and is in widespread and popular use.

In order to service and/or repair an engine of such a tractor design the cab is tilted upward and forward to expose the engine and drive train. At least one illustration of such a unit may be had by reference to U.S. Pat. No. 3,761,123 to Neill et al., of common assignment with the subject application. In this patented design a hydraulic cylinder is utilized to tilt the cab from a normal running horizontal position to a tilted position as depicted in FIG. 1 of the patent.

To cushion and suspend the cab with respect to the tractor chassis during a normal over-the-road running operation, each corner of the cab is preferably supported by a hydraulic cylinder and spring combination which is known as a fully suspended cab. Although a cab suspension is highly desirable for operator comfort, disadvantages exist in such systems. In this connection, a suspended cab tends to roll from side-to-side during cornering. In a similar vein, a suspended cab tends to "dive" forward when the tractor brakes are applied. If a single tilting cylinder is utilized at one side of the cab suspension system may permit the cab to torque excessively during a raising or lower operation. If the cab does cant on the forward suspension cylinders during such service sequencing the cab may damage peripheral components of the tractor engine such as the radiator.

The difficulties suggested in the preceding are not intended to be exhaustive, but rather are among many which may tend to reduce the effectiveness of prior tractor cab suspension and tilting systems. Other noteworthy problems may also exist; however, those presented above should be sufficient to demonstrate that tractor suspension and tilting systems appearing in the past will admit to worthwhile improvement.

It would be desirable to provide an integral tilt-cab suspension and tilting system which will minimize the damaging tendency of torsional effects of the cab as it tilts forward and returns with respect to the tractor engine. Additionally it would be desirable to provide such an integral system with enhanced suspension, roll and pitch characteristics.

OBJECTS OF THE INVENTION

Accordingly, it is a general object of the invention to provide an integral tilt-cab suspension and tilting system which will obviate and/or minimize problems of the type previously described.

It is a particular object of the invention to provide an integral tilt-cab suspension and tilting apparatus wherein a tendency of the cab to roll about an axis longitudinal to the cab is minimized.

It is another object of the invention to provide an integral tilt-cab suspension and tilting apparatus which will minimize a tendency of the cab to "dive" or pitch forward during braking of the tractor.

It is a further object of the invention to provide an integral tilt-cab suspension and tilting apparatus wherein torsional canting of the cab is minimized during a cab raising and lowering operation, even when a single tilting cylinder is utilized.

BRIEF SUMMARY OF THE INVENTION

An integral tiltcab suspension and tilting apparatus according to a preferred embodiment of the invention may be advantageously mounted upon a tractor having a chassis or frame and a cab mounted on the chassis and pivotable with respect to the chassis about an axis near the front end thereof. A suspension assembly is mounted between the chassis and cab at each of the left and right, front and rear corners of the cab. The subject integral hydraulic system includes a source of pressurized hydraulic fluid and a first conduit system extending between accumulators and hydraulic cylinders of the suspension system. A three position control valve is mounted downstream of the source of pressurized fluid and selectively delivers fluid via a second hydraulic conduit system to and from a cab tilting cylinder. A third hydraulic conduit system delivering fluid to the first conduit system for selectively extending the suspension cylinders.

In operation the forward suspension cylinders are fully extended prior to tilting the cab with a cab tilt cylinder. Accordingly, the cab is stabilized against torsional canting during a raising or lowering operation.

In addition, the subject integral suspension on tilt system includes double acting forward suspension cylinders and a cross connection system between the push and pull ends of the forward suspension member to minimize cab roll during normal running.

BRIEF DESCRIPTION OF THE DRAWINGS

Other objects and advantages of the present invention will become apparent from the following detailed description taken in conjunction with the accompanying drawings wherein.

DETAILED DESCRIPTION

Figure 1:
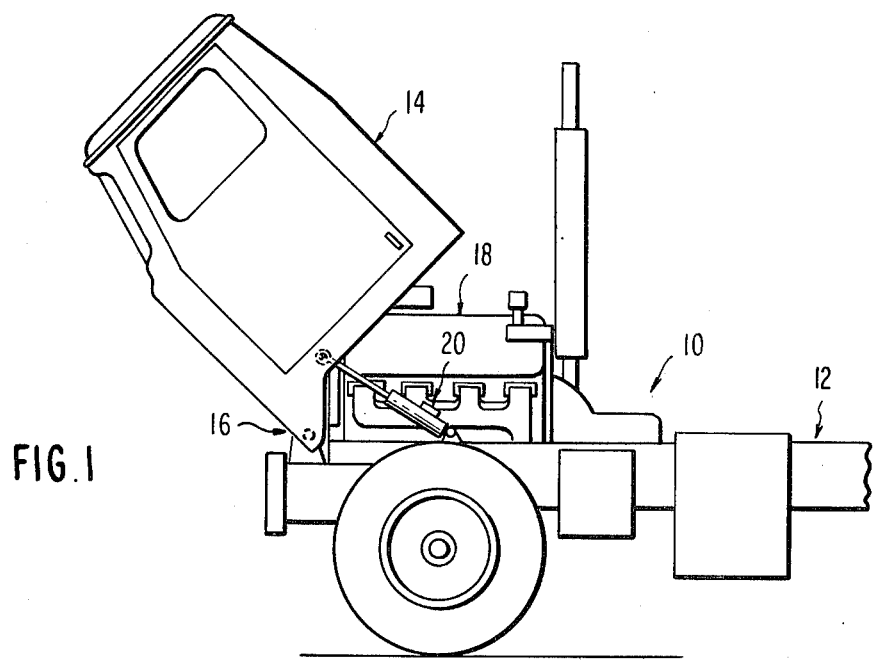
FIG. 1 is a side elevational view of a tractor having a tiltable cab which comprises the operative environment of the subject invention.

Referring now to the drawings wherein like numerals indicate like parts and particularly FIG. 1 thereof there will be seen a tractor 10 comprising a chassis or frame 12 and a cab 14 pivotable relative to the chassis 12 at a forward pivot axis 16 to expose an engine 18 for maintenance and the like. The motion of the cab 14 relative to the chassis 12 is controlled by a hydraulic cylinder 20 as will be discussed in detail below. Although not illustrated, actuation of the hydraulic cylinder 20 is controlled from a station, typically mounted on the chassis, which is remote from the cab 14 and the hydraulic cylinder 20. Accordingly, an operator is entirely out of the way of the pivoting cab 14 while operating the hydraulic cylinder 20.

Figure 2:
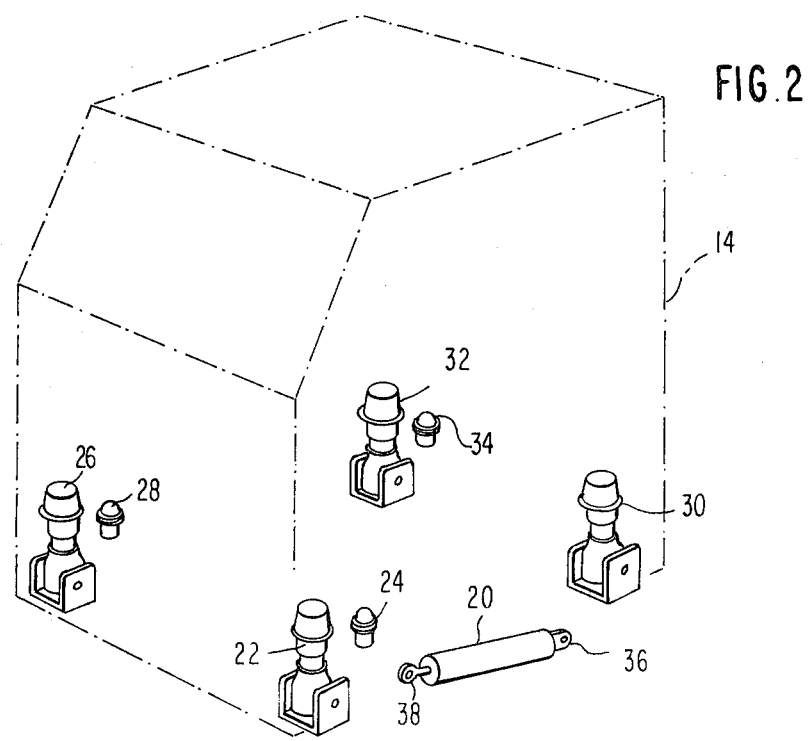
FIG. 2 is a schematic perspective view of the tilt-cab depicted in FIG. 1 disclosing the general arrangement of front and rear, left and right suspension assemblies and a cab tilting cylinder.

Turning to FIG. 2 there will be seen a schematic perspective outline of the pivotable tractor cab 14 in phantom lines to help locate the various principal components of the integral system of the subject invention. In this connection, the forward left portion of the cab is shown to be suspended with respect to the chassis by a suspension assembly 22 of a type known in the art and is operative to cushion the cab with respect to the chassis during normal operation. The suspension as schematically represented by number 22 includes a hydraulic cylinder maintained at a predetermined suspension pressure by an accumulator 24 and hydraulic system. In a similar manner, the forward right-hand side of the cab is supported with respect to the chassis with a suspension cylinder 26 and accumulator 28. The rear suspension includes a left 30 and right 32 suspension cylinder and accumulator 34 connected to both cylinders.

The lifting cylinder 20 is pivotally connected to the tractor chassis at one end 36 and in a similar manner is pivotally mounted to the tiltable cab at 38.

Figure 3:
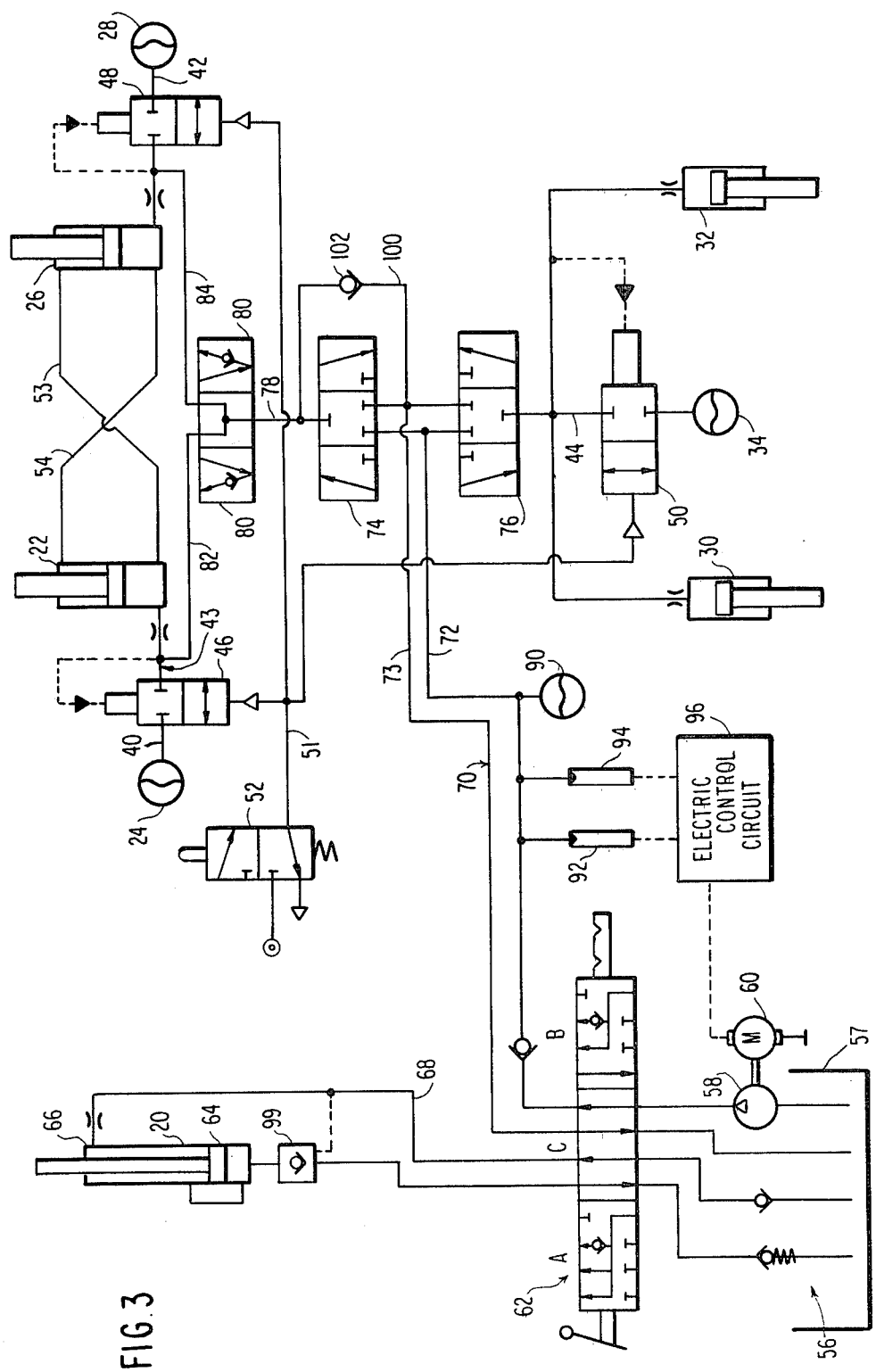
FIG. 3 is a schematic diagram of the hydraulic circuitry of the subject invention.

FIG. 3 discloses a hydraulic schematic of the subject integral cab suspension and tilt system. The previously mentioned front left and right suspension cylinders 22 and 26 are shown in association with their respective accumulators 24 and 28 and interconnected by hydraulic lines 40 and 42, respectively, of a first conduit system 43. In a related manner, the rear left 30 and right 32 suspension cylinders are connected to accumulator 34 via line 44. The hydraulic line 44 is also a part of the first conduit system.

A shut-off valve 46 is positioned within line 40 between accumulator 24 and suspension cylinder 22. In a similar manner, a shut-off valve 48 is positioned within line 42 between accumulator 28 and suspension cylinder 26 and a further shut off-valve 50 is interposed within line 44 between accumulator 34 and rear suspension cylinders 30 and 32. These shut-off valves are of conventional design and operably connect via line 51 to a pneumatic valve 52 which is actuated by a brake cylinder of the tractor brake system. Accordingly, when the tractor brakes are applied, the shut-off valves function to isolate the suspension cylinders from the respective accumulators and thus terminate cushioning action by the accumulators. The shut-off valve operably functions to prevent the cab from "diving" or pitching forward relative to the chassis during a breaking operation.

The forward left and right cushioning cylinders 22 and 26 are preferably double acting hydraulic cylinders and are hydraulically interconnected by crossover conduits 53 and 54 which interconnect the push end of cylinder 22 with the pull end of cylinder 26 and the push end of cylinder 26 with the pull end of cylinder 22 respectively. This interconnection of the oil chambers of both cylinders results in a high roll stiffness of the cab suspension.

A source of hydraulic fluid is schematically shown at 56 and is composed of a reservoir 57, a pump 58, and motor 60. The hydraulic fluid source operably delivers pressurized fluid from the reservoir to a three position control valve 62. The three positions of valve 62 comprise a first up position, "A"; a second down position, "B"; and a third drive position, "C". The up and down positions are utilized primarily to deliver hydraulic fluid under pressure to the push end 64 and the pull end 66 of the tilting cylinder 20 during cab tilting and return operation via a second conduit system 68.

A third conduit system 70 extends from the three position control valve 62 and is primarily operative in the drive mode to deliver pressurized hydraulic fluid to the suspension system. More specifically, a pressure line 72 of the third conduit system delivers hydraulic fluid to and through leveling valve 74 and 76 associated with the front and rear suspension cylinders respectively. Downstream of leveling valve 74 the third conduit system delivers hydraulic fluid via line 78 to a balancing valve 80 and then through conduits 82 and 84 to the first counduit system 43 and lines 40 and 42. The leveling valve 74 operably corrects for static deflection of the cab and the balancing valve functions to keep static deflections equal for the right and left suspension cylinders during corrective action of the leveling valve.

In a somewhat similar vein, the leveling valve 76 is positioned between rear suspension cylinders 30 and 32. The leveling valve 74 and 76 are mechanically linked to points on or near the roll axis of the cab. Therefore, the valves will not react to roll movements of the cab.

In addition to individual suspension cylinder accumulators 24 and 28 and dual cylinder accumulator 34, the subject hydraulic accumulator system includes a master or main hydraulic accumulator 90 positioned within the pressure line 72 of the third conduit system. The master accumulator 90 stores a certain amount of hydraulic fluid under pressure, which can be supplied immediately upon demand by the leveling valves and which can compensate for internal leakages within the system. Pressure in the main accumulator 90 is operably regulated between an upper and lower limit by a pair of pressure switches which are set for upper and lower pressure limits respectively. An electronic control circuit 96 is connected to the pressure switches and to a motor 60. If pressure in the main accumulator drops below the lower limit, the electric pump 60 will be switched on and the accumulator will be repressurized until the upper limit is reached.

The third hydraulic conduit system 70 also includes a return line 73. A by-pass conduit 100 is positioned around the leveling valve 74 and includes a one way check valve 102 which is normally closed in the direction of hydraulic fluid return.

OPERATING SEQUENCE

In operation, hydraulic fluid is continually supplied to the suspension system via pressure line 72 and the master accumulator pressure sensing and automatic pump system. Pressurized hydraulic fluid is constantly available through the leveling valves to the suspension cylinders and through a balancing valve between the forward cylinders. This pressurized fluid is delivered to a third conduit system which extends between accumulators 24, 28 and 34 and the associated suspension cylinders. The fully pressurized accumulators in association with the cylinders thus act to provide cushioned suspension for the cab during normal driving operations. When the tractor brakes are applied, shut-off valves automatically remove the accumulators from the suspension system and enable braking to occur without excessive forward pitching or diving action of the cab. The forward left and right accumulators 22 and 26 are formed with double acting cylinders and the push and pull hydraulic chambers are fluidically cross-connected and the ratio of the rod diameter and tube diameter of the cylinders is preferably selected to provide a high roll stiffness for the cab suspension.

When it is desired to service the vehicle and tilt the cab forward, the tractor emergency brakes are applied thus again actuating shut-off valves 46, 48 and 50 and isolating the suspension cylinders from respective accumulators. The valve 62 is set in the "A" position and hydraulic fluid under pressure is supplied to the return line 73, through by-pass conduit 100 and check valve 102, to forward suspension cylinders 22 and 26 to "pump out" the cylinders to a fully extended position. The push end of the lifting cylinder 20 is pressurized through pilot operated check valve 99 and the tractor cab tilts forward. During this tilting action of the cab the cab is fully secured by the extended suspension cylinders and will not cant excessively even when a single tilting cylinder is positioned at one side of the tractor. Accordingly, peripheral tractor engine parts, such as the radiator and the like, will be free from interfering contact with the interior surface of the cab during the tilting operation. A similar sequence takes place during lowering of the cab when the valve is set in position "B".

In describing the invention, reference has been made to a preferred embodiment. Those skilled in the art will recognize several advantages which are expressly or inherently disclosed by this embodiment. Without attempting to detail all of the advantages of the subject invention, a particularly significant aspect is the provision of integral tilt cylinder and hydraulic suspension system utilizing a single source of pressurized hydraulic fluid.

The forward suspension cylinders are double acting and hydraulic chambers are cross-connected to provide a degree of role stability for the cab during running operation.

During braking, the suspension cylinders are automatically locked out of communication with the associated accumulators thus minimizing diving action of the cab.

Still further, the forward suspension cylinders 22 and 26 are operably fully extended prior to tilting action of the cab and thus minimizing the possibility that the cab may awkwardly cant and damage peripheral members of the engine systems such as the radiator.

In describing the invention, reference has been made to a preferred embodiment. Those skilled in the art, however, and familiar with the disclosure of the subject invention, may recognize additions, deletions, modifications, substitutions, and/or other changes which will fall within the purview of the invention as defined in the following claims.

I claim:
1. In a tilt-cab tractor comprising:
 (a) a chassis;
 (b) a generally four-cornered cab mounted on said chassis and pivotable with respect to said chassis about an axis near the front end of said chassis;
 (c) a suspension cylinder mounted between said chassis and said cab at each of a left and right front and rear corner of said cab;
 (d) accumulator means hydraulically connected to said suspension cylinders for providing cushioning in cooperation with said cylinders between said cab and said chassis;
 (e) first conduit means for fluidically connecting said accumulator means and said suspension cylinders;
 (f) at least one hydraulic cab tilting cylinder means pivotally mounted between said chassis and said cab to selectively tilt said cab between a normal running fully suspended position and a raised service position wherein the improvement comprises an integral hydraulic cab suspension and tilt system including:
 a source of pressurized hydraulic fluid for selectively delivering pressurized hydraulic fluid to said at least one hydraulic cylinder means and said shock absorber suspension cylinders;
 second hydraulic conduit mean for delivering hydraulic fluid to and returning hydraulic fluid from said at least one hydraulic cab tilting cylinder means;
 third hydraulic conduit means for delivering hydraulic fluid to said first conduit means fluidically connecting said accumulator means and said shock absorber suspension cylinders;
 control valve means interposed between said source of pressurized hydraulic fluid and said second and third hydraulic conduit means for selectively delivering fluid to said at least one hydraulic cab tilting cylinder means and said first conduit means; and
 means connected to said first conduit means for selectively blocking flow of pressurized hydraulic fluid to said accumulator means when the tractor brakes are applied.

2. In a tilt-cab tractor as defined in claim 1 wherein said control valve comprises:
 a three position valve having an up position, a down position, and a drive position for operably extending said at least one cab tilting cylinder, lowering said at least one cab tilting cylinder and delivering hydraulic fluid to said suspension cylinders respectively, said up position being further operable for pressurizing the front-left and front-right suspension cylinders to fully extend the front cylinders prior to tilting of said cab with respect to said chassis.

3. In a tilt-cab tractor as defined in claim 2 and further comprising:
 leveling value means extending within said third hydraulic conduit means between said control valve and said suspension cylinders.

4. In a tilt-cab tractor as defined in claims 2 or 3 and further comprising:
 balancing valve means positioned with said third hydraulic conduit means and between the push ends of said front-left and front-right suspension cylinders.

5. In a tilt-cab tractor as defined in claims 4 wherein said accumulator means comprises:
 a first hydraulic fluid/gas accumulator connected to the push end of said front-left suspension cylinder;
 a second hydraulic fluid/gas accumulator connected to the push end of said front-right suspension cylinder; and
 a third hydraulic fluid/gas accumulator connected between the push ends of said rear-left and rear-right suspension cylinders.

6. In a tilt-cab tractor as defined in claim 5 wherein said means connected to said first conduit means for selectively blocking flow of fluid to said accumulator means comprises:
 a shut-off valve operably connected to each of said first, second and third accumulators to isolate said accumulators from said shock absorber suspension cylinders upon applying the brakes of the tractor.

7. In a tilt-cab tractor as defined in claim 5 wherein said accumulator means further comprises:

a master hydraulic fluid/gas accumulator positioned within said third hydraulic conduit means downstream of said three postion control valve.

8. In a tilt-cab tractor as defined in claim 7 and further comprising:
high pressure and low pressure switches connected to said third hydraulic conduit means between said three position control valve and said master hydraulic fluid/gas accumulator; and
circuit means responsive to said pressure switches to start and stop a motor pump combination to maintain hydraulic fluid pressure within said third conduit means within an upper and lower limit.

9. In a tilt-cab tractor as defined in claim 3 wherein:
said up position of said three position control valve being selectively operable to deliver pressurized hydraulic fluid through a return side of said third hydraulic conduit means, bypassing said leveling value means, to the push end of said front-left and front-right suspension cylinders to extend said front cylinders.

10. In a tilt-cab tractor as defined in claims 1, 2 or 3 wherein:
said front-left and front-right suspension cylinders are double acting and operable in a push and pull mode; and
cross-over conduit means interconnecting the push end of the front-left cylinder with the pull end of the front-right cylinder and the push end of the front-right cylinder with the pull end of the front-left cylinder wherein the front suspension members will exhibit resistance to cab roll about an axis longitudinal of the tractor.

11. In a tilt-cab tractor as defined in claim 4 wherein:
said front-left and front-right suspension cylinders are double-acting and operable in a push and pull mode; and
cross-over conduit means interconnecting the push end of the front-left cylinder with the pull end of the front-right cylinder and the push end of the front-right cylinder with the pull end of the front-left cylinder wherein the front suspension members will exhibit resistance to cab roll about an axis longitudinal of the tractor.

* * * * *